No. 616,905. Patented Jan. 3, 1899.
A. M. CUSHING.
BICYCLE BRAKE.
(Application filed Feb. 21, 1898.)

(No Model.)

Witnesses:
W. B. Payne
V. B. Newton

Inventor:
Alvin M. Cushing
by J. M. Fowler Jr.
Attorney

THE NORRIS PETERS CO., PHOTO-LITHO., WASHINGTON, D. C.

United States Patent Office.

ALVIN M. CUSHING, OF SPRINGFIELD, MASSACHUSETTS.

BICYCLE-BRAKE.

SPECIFICATION forming part of Letters Patent No. 616,905, dated January 3, 1899.

Application filed February 21, 1898. Serial No. 671,112. (No model.)

*To all whom it may concern:*

Be it known that I, ALVIN M. CUSHING, a citizen of the United States, residing at Springfield, in the county of Hampden and State of Massachusetts, have invented certain new and useful Improvements in Bicycle-Brakes; and I do hereby declare the following to be a full, clear, and exact description of the invention, such as will enable others skilled in the art to which it appertains to make and use the same.

This invention relates to brakes, and more particularly to that class adapted to be applied to bicycles.

The object of my invention is to provide a bicycle-brake which is exceedingly simple and inexpensive in construction, easily and quickly applied, efficient, reliable, and convenient in use. For the attainment of these objects and for other purposes hereinafter enumerated in brief the invention consists in certain details of construction, arrangement, and combination of parts, all of which will be more fully described hereinafter.

The novel features of the invention are embraced in the appended claim, which is intended to accord in its terms, spirit, and meaning with the prior state of the art and the existing law.

Figure 1:
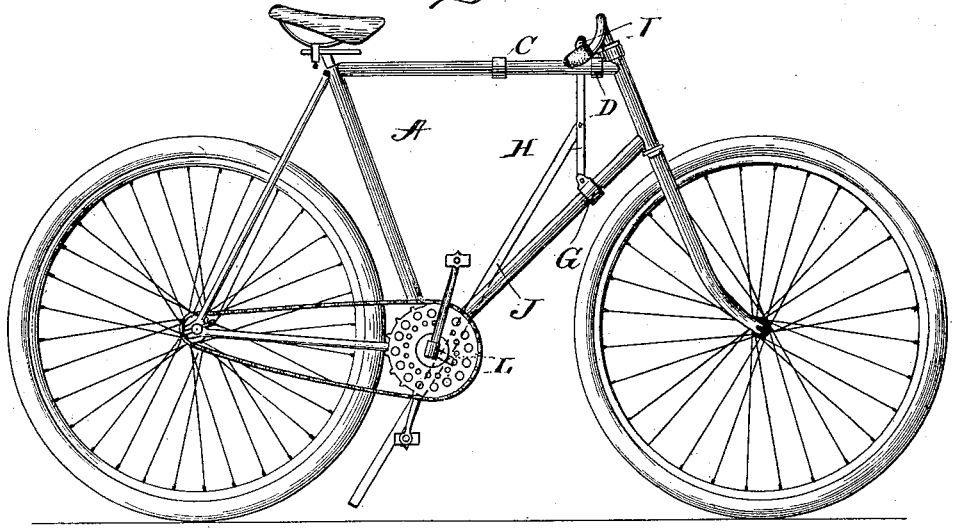
Figure 2:
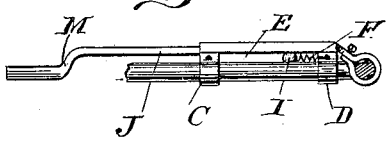
Figure 3:
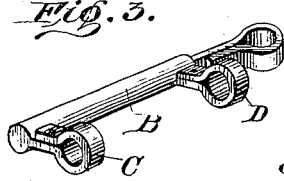

In the drawings forming a part of this specification, Figure 1 is a side elevation of a bicycle, showing my improved brake applied. Fig. 2 is a plan of the complete brake. Fig. 3 is a detail view showing the construction of the metal plate.

Referring by letters to the drawings, A represents an ordinary bicycle having my improved brake applied thereto, which consists of a metal plate B, provided with dependent arms C and D, projecting at right angles thereto, the arm C being at one end thereof and the arm D approximately near the other end. This plate is adapted to be secured to the frame upon the upper bar by clamping the arms around the same and the free end of the plate around the steering head or post. Any improved means for securing the plate in position may be employed without materially altering the nature of my invention. If desired, clamps having thumb-screws therein may be used, thus providing means whereby the brake may be easily and quickly removed.

Within the space or slot E formed by the plate and the bar to which it is secured is a spiral or coiled spring F, connected to the dependent arm D, the object of which will be hereinafter explained.

Mounted upon the lower bar of the frame is an adjustable detachable sleeve or collar G, provided with a thumb-screw or other improved means for securing the same in a rigid or fixed position, and pivotally secured thereto is a rod or bar H, adapted to project up through the slot E, being supported therein approximately near the steering-head by the spiral or coiled spring F and provided with a handle I upon its free end. Pivotally secured to this rod by one end is a second rod J, adapted to rest upon the crank-bearing and held in position by a loop or ring L, which allows the same to slide freely therein, the free end of which is curved or bent, as at M, so as to bring it in line with the center of the wheel. This form of rod is employed in connection with those bicycles having the frame constructed with a direct or straight rear post, and when the brake is applied to those bicycles having a truss-frame the rod may be made straight and adapted to rest between the truss.

Mode of operation: Clasp the handle I and draw it toward the saddle, thus moving the rod H upon its bearing, and thereby forcing the rod J, which is pivotedly secured thereto, in engagement with the ground, release the handle, and the coiled spring F forces the brake back in place. It will thus be seen that I provide an exceedingly cheap and simple brake, one that will proficiently perform all of its intended functions, is perfectly safe and reliable, and easily and quickly applied.

I deem the foregoing explanation sufficiently plain that the improvements will be readily understood by all conversant with such matters, the extreme simplicity rendering an elaborate description unnecessary.

Having thus described the various features of my invention, what I claim as new, and desire to secure by Letters Patent, is—

In a bicycle-brake, the combination of a metal plate, having dependent arms, one of which projects at right angles to one end of the said plate, the other projecting at right angles to the plate approximately near the other end, the said arms adapted to be clamped around the upper bar of a bicycle-frame, and the free end of the plate around the steering-head, of a coiled spring secured in the slot formed by the said metal plate and bar to which it is secured, of an adjustable, detachable sleeve secured upon the lower bar of the frame, of a rod pivotally secured thereto projecting up through the said slot, and held therein approximately near the steering-head by the said spring, the said rod provided with a handle, of a second rod pivotally secured to the first-mentioned rod, adapted to rest upon the crank-bearing, having its free end bent in a line with the center of the wheel, of a loop to hold the said bar in position, substantially as shown and for the purpose set forth.

In testimony whereof I affix my signature in presence of two witnesses.

ALVIN M. CUSHING.

Witnesses:
STUART M. ROBSON,
H. K. HAWES.